A. E. HART.
GASKET AND RETAINER THEREFOR.
APPLICATION FILED AUG. 29, 1912.
1,082,324.
Patented Dec. 23, 1913.
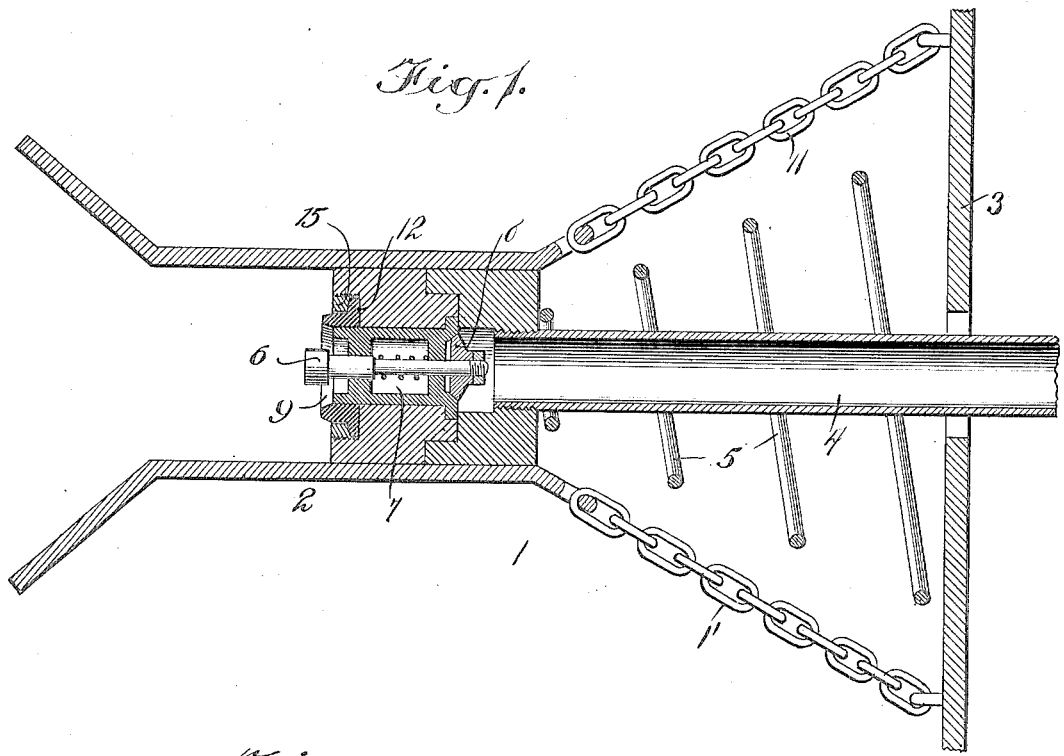
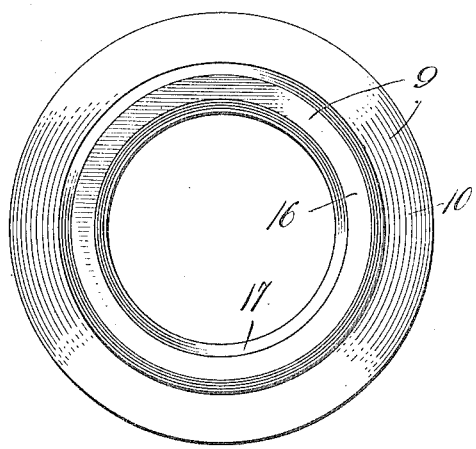
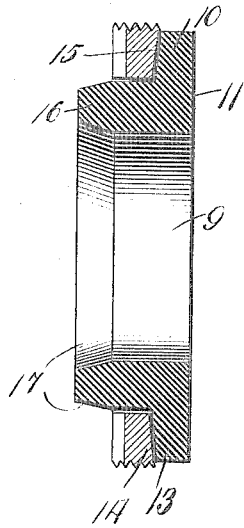
WITNESSES
INVENTOR
Albert E. Hart
BY
ATTORNEYS

UNITED STATES PATENT OFFICE.

ALBERT E. HART, OF NEW YORK, N. Y.

GASKET AND RETAINER THEREFOR.

1,082,324.　　　　Specification of Letters Patent.　　Patented Dec. 23, 1913.

Application filed August 29, 1912. Serial No. 717,705.

*To all whom it may concern:*

Be it known that I, ALBERT E. HART, a citizen of the United States, and a resident of the city of New York, New Brighton, borough of Richmond, in the county of Richmond and State of New York, have invented a new and Improved Gasket and Retainer Therefor, of which the following is a full, clear, and exact description.

This invention relates to improvements in gaskets and gasket retainers, and has for an object to provide an improved structure designed to hold a gasket in place in an automatic air coupler under high pressure, the same co-acting with a high pressure air pipe and with resilient means for holding the coupler in a predetermined position for maintaining the gaskets of co-acting coupler heads in contact.

A further object of the invention is to provide a retainer and a gasket wherein the retainer overlaps part of the gasket and not only clamps the same in position but squeezes the same in a radial inward direction to a limited extent.

In carrying out the objects of the invention, a gasket is provided formed with a contact portion and a flange having a beveled surface against which the beveled surface of a retaining ring is positioned. The retaining ring is designed to be screwed in place in the head of a coupler so as to hold the gasket rigidly in place and to crowd the gasket in a radial direction maintaining a tight joint with certain parts of the coupler head. The coupler head may be mounted in position in any desired way but is held resiliently in position by a spring so as to press the abutting gaskets together, and hold the same in that position when the coupling heads are in engagement.

A practical embodiment of the invention is represented in the accompanying drawings forming a part of this specification in which similar characters of reference indicate corresponding parts in all the views.

Figure 1 is a longitudinal vertical section through a coupler and a gasket retainer embodying the invention; Fig. 2 is a plan view of the gasket removed; and Fig. 3 is an edge view of the structure shown in Fig. 1.

Referring to the accompanying drawings by numerals, 1 indicates the coupler as a whole which is supported in position by suitable chains or other flexible members 1', or connected to the supporting plate 3. The supporting plate 3 is connected to a car or other device in any desired manner, the same not forming any part of the present invention. A pipe 4 extends through the plate 3 and is secured to the coupler 2 in any desired way so as to supply or act as a conduit for air which passes through the coupler. A spring 5 surrounds the pipe 4 and at one end presses against the plate 3 and at the opposite end against the coupler 2 so as to maintain the coupler 2 in a predetermined position in respect to plate 3. When a number of cars are provided with the coupler 2 and associated devices just described, and two of the cars are brought together for a coupling, the coupler heads 2 of the connected cars will abut and the plungers 6 of the valve mechanism 7 will be operated for opening the valve members 8 of each of the coupler heads 2. When this takes place the springs 5 of each coupler head will be compressed and thus maintain the gaskets 9 in each coupler head firmly in contact, the springs 5 and associated parts being made of such a size and length as to normally maintain when unclutched the head 2 outwardly a sufficient distance from the plate 3 to allow of this result.

The gasket 9 is provided with a flange 10 having a flattened rear edge 11 engaging the bottom of an annular recess 12 and a beveled upper surface 13 for engaging the beveled inner surface 14 of a retaining ring or rather nut 15. The nut 15 is threaded into the annular recess 12 so as to clamp rigidly therein the flange 10. By providing the beveled portions 13 and 14, the gasket is crowded to a certain extent inwardly as the ring or nut 15 is forced toward the bottom of the annular recess 12, and the compressed gasket tends to hold the ring 15 against accidental movement. Extending outwardly from the flange 11 is a projecting portion or sleeve 16 formed preferably with a chamfered edge 17. The gasket is constructed so as to snugly fit the outer surface of the valve structure 7 and when the ring or nut 15 is screwed down tight the gasket is crowded tightly against the valve structure 7 and consequently prevents leakage at that point or around the threads of the ring 15. This construction and arrangement of gasket, and the arrangement for holding the same in place in the head 2, is especially adapted for use with the head 2, springs 5, and associated parts shown in Fig. 1, as the gasket is positively and rigidly held in place notwithstanding the excessive pressure brought to bear thereon from the air in pipe 4.

In air couplers heretofore in use it has been found that gaskets wear to a considerable extent and also that when high pressure is used the same are often displaced by reason of the high pressure. In the present invention it will be observed that the ring 15 positively clamps the gasket in place and consequently permits the gasket to resist excessively high pressure.

By the arrangement described, the gasket 16 can be quickly removed in case it is worn out or injured, and replaced by a new one, it being only necessary for the operator to unscrew the ring 15 and to withdraw the gasket from its seat and then place another gasket in position and screw up the ring. The ring 15 is provided with notches or recesses for the application of a suitable spanner wrench or other tool for screwing up or unscrewing the ring.

Having thus described my invention, I claim as new and desire to secure by Letters Patent:—

1. In a device of the character described, a gasket formed with a body portion having a sleeve extending therefrom and a flange formed with a beveled upper surface, and a retaining ring formed with a co-acting beveled upper surface for clamping said flange in position and crowding the same radially inwardly.

2. In a device of the character described, a gasket formed with a body portion formed with a sleeve and an annular flange, and a retaining clamping member acting on said flange and said body for crowding the same radially inwardly in order that the gasket may tightly hug the member around which it is placed.

3. In a device of the character described, the combination with the head of an air coupler formed with a passageway therethrough and an annular recess having a threaded wall, said annular recess surrounding said passageway, of a gasket formed with a flange fitting into said annular recess, and a peripherally threaded ring screwed into said annular recess and clamping the flange of said gasket against the bottom of said annular recess, said ring having a beveled bottom for crowding the gasket toward said passageway.

4. In a device of the character described, a gasket formed with a body portion having a sleeve extending therefrom, and a flange formed with a beveled upper surface, and a retaining ring formed with a co-acting beveled surface and with a threaded periphery for clamping said flange in position and crowding the same radially inwardly.

5. In a device of the character described, the combination with a coupler head having an annular threaded recess, of a gasket fitting into said recess, and a clamping ring for holding said gasket in place, said gasket being formed with a projecting sleeve and with a flange fitting against the bottom of said annular recess, said flange having a beveled outer surface and said clamping ring being formed with threads on the periphery for engaging the threads on said annular recess and with a slightly beveled or conical shaped end for engaging the bevel on said flange for clamping the flange in said recess and crowding the same radially inward.

6. In a device of the character described, the combination with a coupler head having an annular threaded recess, of a gasket fitting into said recess, and a clamping ring for holding said gasket in place, said gasket being formed with a projecting sleeve or body and with a flange fitting against the bottom of said annular recess, said clamping ring being formed with threads on the periphery for engaging the threads on said annular recess whereby said ring is adapted to clamp said flange against the bottom of said recess when the ring is screwed into position.

7. In a gasket, a tubular body formed at one end with a chamfered edge on the interior and exterior for providing a contacting surface or nose, and a radiating flange extending from the opposite end of said body, said radiating flange being formed with a beveled upper surface and a flat lower surface whereby when pressure is brought to bear thereon the same will be crowded radially inward.

In testimony whereof I have signed my name to this specification in the presence of two subscribing witnesses.

ALBERT E. HART.

Witnesses:
TheO. G. Hoster,
Philip D. Rollhaus.